LIGHT BEAM MODULATION AND COMBINATION APPARATUS

Filed Jan. 31, 1967 2 Sheets-Sheet 1

INVENTOR.
FRIEDRICH BIEDERMANN
BY
Michael J. Striker
Atty

INVENTOR.
FRIEDRICH BIEDERMANN
BY
Michael J. Striker
Attorney

United States Patent Office 3,510,571

Patented May 5, 1970

3,510,571
LIGHT BEAM MODULATION AND COMBINATION APPARATUS

Friedrich Biedermann, Unterhaching, near Munich, Germany, assignor to Agfa-Gevaert Aktiengesellschaft, Leverkusen, Germany Filed Jan. 31, 1967, Ser. No. 612,875
Claims priority, application Germany, Feb. 4, 1966, A 51,504
Int. Cl. H04n 9/14
U.S. Cl. 178—5.4 14 Claims

ABSTRACT OF THE DISCLOSURE

A color television receiver which utilizes one or more lasers and mechanical-optical means, including one or two Weiller mirror wheels, for reproducing color pictures on the phosphor screen. The reproduction of pictures can be carried out in accordance with the simple or interlaced scanning method.

BACKGROUND OF THE INVENTION

The present invention relates to light beam modulation and combination in general, and more particularly to improvements in color television receivers.

Presently known color television receivers comprise so-called color kinescopes, i.e., a special type of cathode ray tubes which are used in black-and-white television receivers. The phosphor screen of a color kinescope consists of several hundred thousand phosphor dot trios or clusters whose number depends on the number of picture points. Each cluster comprises a red, a blue and a green-emitting phosphor dot. The kinescope further comprises three electron guns and a shadow mask which shields two of the dots so that a beam current can energize only the remaining dot, depending on the corresponding basic color.

The manufacture of color kinescopes is costly and involves work of exceptional precision in order to avoid that the electron beams will strike the dots of other than their particular color. Complicated correction circuits were developed to prevent undesirable excitation of more than one dot in each cluster. Such correction circuits contribute greatly to higher cost of color television receivers.

The receivers of earlier television systems comprise mechanical-optical means including so-called Nipkow disks and Weiller mirror wheels. The use of such devices was discontinued in the above-outlined more recent types of color television receivers because they are impractical in connection with conventional light sources, particularly when the picture consists of a large number of points. Conventional light sources produce light beams which fan out just like a flashlight beam, in contrast to laser light which is coherent and can form a straight, narrow beam of high intensity for long distances.

Accordingly, it is an important object of the present invention to provide a color television receiver which utilizes laser light and whose mechanical and electronic systems are much simpler than the corresponding systems of presently known color television receivers.

Another object of the invention is to provide very simple and compact optical means for uniting laser light beams of different basic colors and equally simple, compact and inexpensive mechanical-optical means for reproducing pictures on the phosphor screen of a color television receiver.

A further object of the invention is to provide a color television receiver wherein the mechanical-optical means comprises one or two Weiller mirror wheels and wherein the light beams must travel a relatively short distance on their way from the laser source or sources to the phosphor screen.

An additional object of the invention is to provide a receiver of the above outlined characteristics wherein a single laser suffices to furnish concentrated light beams in the three basic colors.

A concomitant object of the invention is to provide a receiver wherein the reproduction of pictures can be carried out in accordance with the simple or interlaced scanning method.

SUMMARY OF THE INVENTION

One feature of my invention resides in the provision of a color television receiver which comprises laser means (including one or more lasers) arranged to emit laser light beams in the three basic colors red, blue and green, control means for modulating the light beams in accordance with the video signals from the camera, optical means for uniting the thus modulated laser beams, a phosphor screen, and mechanical-optical means for directing the thus united beams onto the screen to retrace the scene thereon.

The mechanical-optical means may comprise one or more mirror wheels (also called Weiller wheels) having a series of peripheral light-reflecting surfaces, and the control means may be built into or installed outside of the laser means. The optical means for uniting the laser beams may comprise a system of interference mirrors or filters whose number and/or mounting will depend on the number of lasers. If the receiver comprises three lasers, one for each basic color, the optical means may comprise two interference mirrors each of which reflects one of the basic colors. If the receiver comprises a single laser, the optical means may comprise two groups of interference mirrors.

The novel features which are considered as characteristic of the invention are set forth in particular in the appended claims. The improved color television receiver itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
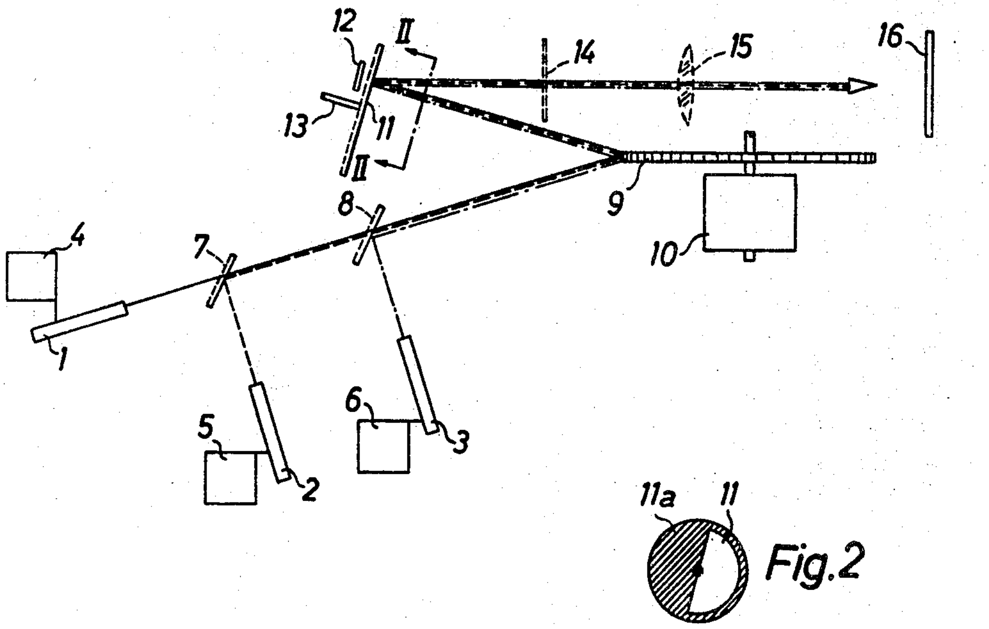
FIG. 1 is a schematic side elevational view of a color television receiver with three lasers which embodies one form of the present invention and whose mechanical-optical means includes a single mirror wheel, two mirrors, a transparent screen, and an objective for depicting the transparent screen on the phosphor screen.
FIG. 2 is a front elevational view of one of the two mirrors as seen in the direction of arrows from the line II—II of FIG. 1.

Referring to FIG. 1, there are shown three lasers 1, 2 and 3 which respectively constitute sources of blue, red and green light. Such lasers are well known in the art and their exact construction forms no part of the present invention.

The lasers 1, 2, 3 are respectively associated with control circuits 4, 5, 6 which regulate the intensity of emitted laser light as a function of the individual video signals. Suitable control circuits are disclosed, for example in German Pats. Nos. 439,845 and 489,659. The control circuits disclosed in these patents are installed outside of the respective lasers and may comprise Kerr cells, birefringent crystals or interference control devices whose operation is based on electrostriction. Alternatively, the control circuits may operate on the neutralization principle disclosed in the "Nachrichtentechnische Zeitschrift" of October 1964 and are then arranged to directly control the emission of light by the respective lasers. Such control circuits are then installed in the lasers and may comprise birefringent crystals. It is to be noted that processes for varying the intensity of laser light are well known and, therefore, the exact construction of the control circuits 4–6 need not be described here.

The three laser lights are mixed in accordance with a procedure which is known, for example, from the art of photocopying, for example, by resorting to interference mirrors or filters 7 and 8. The mirror 7 permits the passage of blue light but is red-reflecting and the mirror 8 permits the passage of purple light but is green-reflecting. The thus united laser light impinges against successive reflecting surfaces provided on the periphery of a mechanical scanning disk here shown as a so-called "Weiller" mirror wheel 9 which is continuously driven by a synchromotor 10 at a rate of one revolution per picture. The number of reflecting surfaces on the wheel 9 corresponds to the number of scanning lines in a picture. The reflecting surfaces of the wheel 9 constitute the sides of a regular polygon but each thereof has a different inclination with reference to the wheel axis; the extent of inclination increases from surface to surface and the total change in inclination during a full revolution of the wheel 9 corresponds to the height of the phosphor screen 16.

The heretofore described structure is capable, by itself, of reproducing a color picture on the phosphor screen 16. The distance $d$ between the wheel 9 and screen 16 is then determined by the equation $d$=h.k./$4\pi$, wherein $k$ is the total number of reflecting surfaces on the wheel 9 (and the number of scanning lines) and $h$ is the height of the phosphor screen 16. Assuming that $k=625$ and $h=$ 50 cm. the screen 16 would have to be placed at an excessive distance (25 meters) from the wheel 9. This is not practical and, therefore, the distance between the parts 9 and 16 must be reduced to a small fraction of 25 meters. Substantial improvements can be achieved by resorting to the so-called interlaced scanning or double scanning method according to which scanning is not done for adjacent lines in order, but the picture is scanned over alternate lines first and is then scanned over again over those missed the first time. Such interlaced scanning necessitates the provision of two additional mirrors 11 and 12 the former of which is mounted on a driven shaft 13 and rotates at half the speed of the wheel 9. The mirror 12 is stationary and is located behind the mirror 11. The rotational speed of the mirror 9 is then twice the picture frequency.

FIG. 2 shows the construction of the mirror 11. This mirror is mounted on a disk 11*a* which is transparent, and the mirror 11 resembles a semicircle so that, during each revolution of the disk 11*a*, light reflected by surfaces on the wheel 9 will reach the mirror 12 during one-half of each revolution of the shaft 13. The arrangement is such that the mirror 11 reflects light during a first revolution and the mirror 12 reflects light during the next following revolution of the wheel 9. The mirrors 11, 12 are mutually inclined to the extent corresponding to the distance between two adjoining scanning lines on the phosphor screen 16. By resorting to the interlaced scanning method, the number of reflecting surfaces on the mirror wheel 9 can be reduced so that it corresponds only to the number of lines which are scanned during a full revolution and the distance between the wheel 9 and phosphor screen 16 can be reduced by the factor ½. The path of the light beam can be shortened still further by utilizing a transparent picture screen 14 which is depicted on the phosphor screen 16 by an objective 15.

If the cross-sectional area of the united laser light is 1 x 1 mm.$^2$, the area of each reflecting surface on the wheel 9 is 0.5 x 1 mm.$^2$. This is due to the fact that two surfaces of the wheel 9 must reflect at the same time in order to avoid a decrease in light intensity at the edges of the screen 16. By resorting to a laser light of the just outlined cross-sectional area, the dimensions of the wheel 9 can equal or approximate those shown in FIG. 1. For a frequency of 25 pictures per second, and by resorting to interlaced scanning, the wheel 9 must rotate at 3,000 r.p.m. which can be readily achieved by utilizing a commercially available synchromotor.

Figure 3:
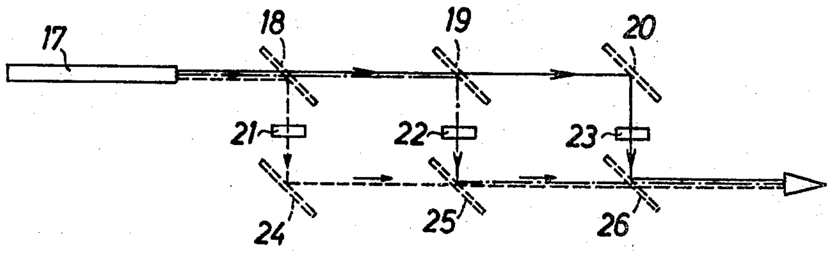
FIG. 3 is a diagrammatic side elevational view of a portion of a second color television receiver which comprises a single laser.

FIG. 3 illustrates a portion of a second color television receiver utilizing a single laser 17 which emits laser light at a plurality of frequencies including blue, red and green light. The mixed light issuing from the laser 17 impinges upon an optical resolving system of the type known, for example, from the art of color film copying. In the illustrated embodiment, the mixed light impinges at an angle of 45 degrees upon an interference mirror or filter 18 which is red-reflecting but does not interfere with the passage of other light. The red light is deflected at an angle of 90 degrees with reference to its original path and impinges at an angle of 45 degrees against a second mirror or filter 24 which may be fully reflecting or red-reflecting as the mirror 18. If the mirror 24 is red-reflecting, it separates the incoming light from traces of other than red light. A modulator 21 (such as a KDP crystal) is installed between the mirrors 18 and 24 to modulate the red light in dependency on the video signal from the camera.

The thus reflected and modulated red light passes through interference mirrors or filters 25, 26 without undergoing any changes because these filters permit unobstructed passage of red light. The mixture of green and blue light which has passed freely through the mirror 18 is directed against a 45-degree interference mirror or filter 19 which is green-reflecting so that the green light passes through a modulator 22 (whose function is analogous to that of the aforementioned modulator 21). Modulated green light is reflected on the 45-degree interference mirror 25 and is united with red light which was reflected at 24. Both lights (red and green) pass freely through the interference mirror 26.

The blue light which has passed through the interference mirror 19 is reflected by a 45-degree interference mirror or filter 24 and passes through a third modulator 23 to be reflected by the interference mirror 26 so that it is ultimately superimposed on the green and red lights. The three light beams can complement each other to produce white light. The thus united light beams are then directed against the reflecting surfaces of the mirror wheel 9 which is not shown in FIG. 3.

If the light produced by the laser 17 of FIG. 3 contains only two basic colors, the receiver must comprise an additional laser, i.e., one of the lasers 1–3 shown in FIG. 1. That laser which replaces two of the lasers 1–3 is then combined with an optical resolving system which is a simplified version of the resolving system shown in FIG. 3. An illustration of the just described modification is not considered necessary since it merely involves the use of one of the lasers 1–3, e.g., the laser 1, a modified version of the laser 17, and an optical resolving system which comprises the elements 18, 19, 21, 22, 24 and 25 of FIG. 3.

It is already known to construct a laser in such a way that it can continuously emit light beams of different wavelengths. For example, an argon laser can emit light beams of nine different wavelengths in the spectral region between blue and green. If such mixed light contains two or all three of the three basic colors required in color television, the number of lasers in my arrangement can be reduced to two or one. The light beams emitted by a laser which can furnish two or three basic colors are thereupon segregated outside of the laser, preferably by resorting to interference mirrors or filters of the type described in connection with FIG. 3. The thus segregated beams are then modulated in accordance with video signals from the camera and are reunited into a single beam which is thereupon reflected by the novel mechanical-optical system to be utilized for reproduction of images on the phosphor screen.

The clusters of dots required in color television systems with mechanical-optical means for breaking up and for reproduction of images are much simpler and can be produced with less precision than such television systems which utilize color kinescopes.

Figure 4:
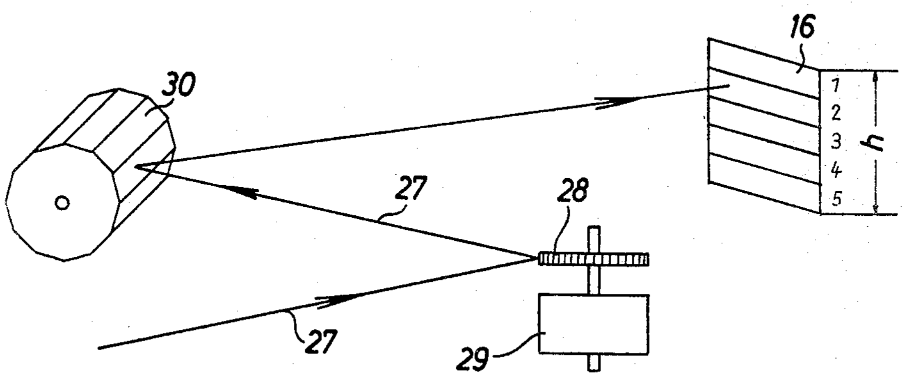
FIG. 4 is a diagrammatic fragmentary perspective view of a third receiver wherein the mechanical-optical means comprises two mutually inclined mirror wheels.

The receivers shown in FIGS. 1 to 3 are satisfactory when the exact distance between the mirror wheel 9 and phosphor screen 16 is of lesser importance. Such distance can be reduced considerably, and the construction of the mirror wheel can be simplified with substantial savings in cost by resorting to the structure which is illustrated in FIG. 4. The structure of FIG. 4 need not utilize a mirror wheel whose reflecting surfaces have different inclinations with reference to the axis of rotation. The inclination of reflecting surfaces on the wheel 9 of FIG. 1 must be selected with a relatively high degree of precision.

FIG. 4 does not illustrate the laser or lasers. The light beam 27 is assumed to correspond to the light beam travelling beyond the interference mirror 8 of FIG. 1 or beyond the interference mirror 26 of FIG. 3 and includes green, red and blue light. The beam 27 has been modulated in accordance with video signals and impinges upon the reflecting surfaces of a mirror wheel 28 driven by a prime mover 29, preferably an electric synchromotor. All reflecting surfaces of the wheel 28 have the same inclination with reference to the axis of rotation, i.e., each such surface is parallel to the axis.

The light beam 27 which is reflected on the surfaces of the wheel 28 then impinges upon the reflecting surfaces of a second mirror wheel or drum 30 which resembles a polygonal prism and whose axis of rotation is normal to and crosses in space the axis of the wheel 28. In the course of rotation of the wheel 28, each of its reflecting surfaces reproduces a full scanning line. Reflection of light on the surfaces of the wheel 30 determines the height of the picture. Thus, the wheels 28, 30 cooperate to compose the picture on phosphor screen 16 along two coordinates which make an angle of 90 degrees.

The structure shown in FIG. 4 exhibits the following important advantages:

The drum or wheel 30 takes over scanning in the direction of the height $h$ of the picture. Therefore, the wheel 9 of FIG. 1 can be replaced by a much simpler and less expensive wheel 28. As stated hereinabove, accurate machining of the wheel 9 involves highly skilled labor and the use of precision machinery because the inclination of each reflecting surface on the wheel 9 is different, i.e., such reflecting surfaces are inclined not only with reference to each other but each thereof has a different inclination with reference to the axis of the wheel 9.

Secondly, and since the inclination of each reflecting surface on the wheel 28 (with reference to the axis of rotation) is the same, the number of such reflecting surfaces need not equal the number of scanning lines, i.e., the number of reflecting surfaces is less and preferably only a small fraction of the number of scanning lines. Therefore, the mirror wheel 28 is much smaller and lighter than the wheel 9 and the energy requirements of the prime mover 29 are minimal. In other words, the motor 29 is very small and consumes less energy than the motor 10 of FIG. 1.

Thirdly, the scanning speed in the direction of the picture height $h$ can be reduced. If the picture is of square outline and comprises $k$ scanning lines, the scanning speed in the direction of the height $h$ is $1/k$ of the horizontal speed. Therefore, the wheel 30 must be driven at a lesser speed and the number of its reflecting surfaces is less than on the wheel 28.

Finally, reduction in the number of reflecting surfaces brings about considerable reduction in the distance between the wheel 30 and the screen 16. This follows naturally from the aforementioned equation. The distance can be reduced still further by resorting to a system of reflecting mirrors between the wheel 30 and screen 16. Thus, the overall dimensions of the receiver are smaller and the weight of the receiver is but a fraction of the previously described receiver.

The ratio of rotational speeds of the wheels 28, 30 is constant. The arrangement is such that the wheel 30 turns through an angle corresponding to the circumferential length of a single reflecting surface thereon while the wheel 28 describes a complete scanning line on the screen 16. By resorting to the interlaced scanning method which reduces flickering of the picture (subdivision of the picture in two halves one of which contains oddly numbered and the other of which contains evenly numbered scanning lines), the rotational speed of the wheel 30 is such that this wheel turns through a distance corresponding to the height of two scanning lines while the wheel 28 scans a single line.

For example, the wheel 28 of FIG. 4 may be provided with sixty-two reflecting surfaces. To reproduce a picture with 620 scanning lines (instead of customary 625 lines), the wheel 28 must complete ten full revolutions. By taking that the number of pictures is twenty-five per minute, the wheel 28 must rotate at 250 revolutions per second or 15,000 r.p.m. If the width of reflecting surfaces is 0.5 mm., the diameter of the wheel 28 will be very small, i.e., in the range of 1 cm. Therefore, such wheel can be driven by a very small synchromotor 29, for example, a two-pole A-C motor which can receive energy from a 250 Hz.-source or a four-pole motor which is connected to a source of 500 Hz.

The rotational speed of the wheel 30 is such that, in the event of simple scanning (as contrasted with interlaced scanning), ten revolutions of the wheel 28 correspond to the scanning of an entire picture, i.e., each reflecting surface of the wheel 30 changes the direction of light by one-tenth of the pitcure height $h$.

When the structure of FIG. 4 operates in accordance with the interlaced scanning method, the height $h$ of the picture must be scanned twice for each 620 lines, i.e., the rotational speed of the wheel 30 is twice its speed during simple scanning because each reflecting surface of the wheel 30 must cover one-fifth of the pitcure height. This is shown in FIG. 4 by the fields 1–5 on the phosphor screen 16.

The dimensions of and the number of reflecting surfaces on the wheel 30 will also depend on its location with reference to the wheel 28 and with reference to the screen 16. In order to avoid very small reflecting surfaces (reference being had to the height of such surfaces as seen in the circumferential direction of the wheel 30), the wheel 30 is preferably placed close to the screen 16. In FIG. 4, the wheel 30 has twelve reflecting surfaces.

Figure 5:
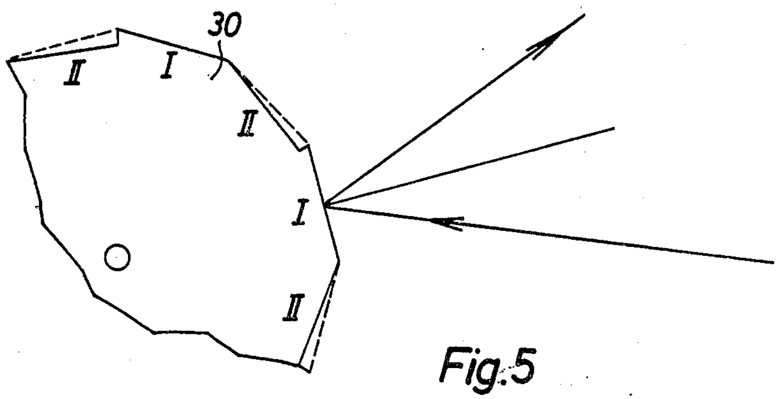
FIG. 5 is an enlarged fragmentary end elevational view of a modified mirror wheel which can be utilized in the receiver of FIG. 4.

Referring finally to FIG. 5, there is shown a modified mirror wheel 130 which can replace the wheel 30 of FIG. 4 when the reproduction of images is carried out in accordance with the interlaced scanning method. This wheel 130 has an even number of reflecting surfaces whose mutual inclination is greater than that of the sides on a regular dodecagon. The evenly numbered reflecting surfaces (marked I) reproduce the oddly numbered scanning lines 1, 3, 5, etc., and the oddly numbered reflecting surfaces (marked II) reproduce the evenly numbered scanning lines 2, 4, 6, etc. The additional inclination of a surface II with reference to the adjacent surface I corresponds to the distance between the scanning lines. The manufacture of the wheel 130 presents no difficulties since it closely resembles a regular polygon with twelve sides.

The utilization of two polygonal mirror wheels 28, 30 or 28, 130, without resorting to an objective, does not affect the quality of pictures and the designer has considerable freedom of locating such wheels with reference to each other, with reference to the laser or lasers, and with reference to the phosphor screen. Another important advantage of my receiver over those which utilize objectives is that the distortion of pictures is less pronounced because each light beam covers the same distance. Other advantages of my mechanical-optical means (such as one or more mirror wheels) include greater compactness because the lasers emit highly condensed beams of light, reduced energy requirements and accurate reproduction of images for long periods of time. The mirror wheels may consist of metallic, vitreous or synthetic plastic material with integral or attached reflecting surfaces.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. A color television receiver, comprising laser means arranged to emit laser beams in three basic colors; control means for modulating the light beams in accordance with the video signals from the camera; optical means for uniting the laser beams; a phosphor screen; and mechanical-optical means for directing the united beams onto said screen to retrace the scene thereon, said mechanical-optical means being arranged to direct the united light beams in accordance with the interlaced scanning method and comprising a mirror wheel rotatable about a fixed axis and including a plurality of peripheral light-reflecting surfaces each of which is inclined differently with reference to said axis, a pair of mirrors arranged to direct light beams reflected by said surfaces onto said screen, said mirrors being inclined with reference to each other to make an angle corresponding to the distance between successive scanning lines on said screen, drive means for moving one of said mirrors with reference to the other mirror, and a prime mover for rotating said wheel about said predetermined axis at such a speed that said wheel completes two revolutions during reproduction of a picture on said screen.

2. A receiver as defined in claim 1, wherein said laser means comprises at least one laser for each of said basic colors.

3. A receiver as defined in claim 1, wherein said laser means comprises a laser arranged to emit light in a plurality of basic colors and wherein said optical means comprises a resolving system.

4. A receiver as defined in claim 3, wherein said resolving system comprises first interference mirror means for each of said plurality of basic colors to segregate the respective light beam from the light emitted by said laser, and second interference mirror means for superimposing the thus segregated light beams upon each other.

5. A receiver as defined in claim 4, wherein said control means comprises a separate modulator for each light beam which is segregated by said first interference mirror means.

6. A receiver as defined in claim 1, wherein said control means comprises electric control circuit means installed outside of said laser means.

7. A receiver as defined in claim 6, wherein said control circuit means includes a Kerr cell.

8. A receiver as defined in claim 6, wherein said control circuit means includes an interference control device whose operation is based on electrostriction.

9. A receiver as defined in claim 6, wherein said control circuit means comprises birefringent crystals.

10. A receiver as defined in claim 1, wherein said control circuit means comprises birefringent crystals.

11. A receiver as defined in claim 10, wherein said control means comprises birefringent crystals.

12. A receiver as defined in claim 1, wherein said optical means comprises interference mirror means.

13. A receiver as defined in claim 1, wherein said one mirror is located in front of the other mirror and said drive means is arranged to maintain said one mirror in the path of light beams from said surfaces to said other mirror during alternate revolutions of said wheel.

14. A receiver as defined in claim 13, wherein said drive means is arranged to rotate said one mirror at half the rotational speed of said wheel.

References Cited

UNITED STATES PATENTS

| | | | |
|---|---|---|---|
| 1,790,491 | 1/1931 | Smith | 178—7.6 |
| 1,791,481 | 2/1931 | Tervo | 178—7.6 |
| 2,173,476 | 9/1939 | Goldmark | 178—5.4 |
| 2,296,944 | 9/1942 | Okolicsanyi | 178—7.6 |
| 3,303,276 | 2/1967 | Haeff | 178—5.4 |
| 3,383,460 | 5/1968 | Pritchard | 178—5.4 |
| 3,436,546 | 4/1969 | Derderian et al. | 178—7.6 |

ROBERT L. GRIFFIN, Primary Examiner

R. P. LANGE, Assistant Examiner

U.S. Cl. X.R.

250—199